United States Patent
Montgomery

(10) Patent No.: US 10,567,354 B2
(45) Date of Patent: Feb. 18, 2020

(54) ENHANCED COMMUNICATION SECURITY

(71) Applicant: FUJITSU LIMITED, Kawasaki-shi, Kanagawa (JP)

(72) Inventor: Hart Montgomery, Redwood City, CA (US)

(73) Assignee: FUJITSU LIMITED, Kawasaki (JP)

( * ) Notice: Subject to any disclaimer, the term of this patent is extended or adjusted under 35 U.S.C. 154(b) by 201 days.

(21) Appl. No.: 15/650,901

(22) Filed: Jul. 15, 2017

(65) Prior Publication Data

US 2019/0020634 A1 Jan. 17, 2019

(51) Int. Cl.
| | |
|---|---|
| *H04L 9/00* | (2006.01) |
| *H04L 29/06* | (2006.01) |
| *H04L 9/08* | (2006.01) |

(52) U.S. Cl.
CPC ........ *H04L 63/0442* (2013.01); *H04L 9/0825* (2013.01)

(58) Field of Classification Search
CPC .. G06F 7/4876; G06F 7/49947; G06F 9/3001; G06F 9/3013; H04L 63/0442
See application file for complete search history.

(56) References Cited

U.S. PATENT DOCUMENTS

2010/0329453 A1* 12/2010 Mehmood ............ H04L 9/0844
380/44

OTHER PUBLICATIONS

Alperin-Sheriff, J., & Apon, D. (2016). Dimension-Preserving Reductions from LWE to LWR. IACR Cryptology ePrint Archive, 2016, 589.

Alwen, J., Krenn, S., Pietrzak, K., & Wichs, D. (2013). Learning with rounding, revisited. In Advances in Cryptology—CRYPTO 2013 (pp. 57-74). Springer, Berlin, Heidelberg.

Joppe Bos, Craig Costello, Léo Ducas, Ilya Mironov, Michael Naehrig,. Valeria Nikolaenko, Ananth Raghunathan, Douglas Stebila, frodo; taking off the ring! Practical, quantum—secure key exchange from LWE. In ACM CCS 16: 23rd conference on Computer and Communications Security, pp. 1006-1018. ACM Press, 2016.

Bogdanov, A., Guo, S., Masny, D., Richelson, S., & Rosen, A. (Jan. 2016). On the hardness of learning with rounding over small modulus. In Theory of Cryptography Conference (pp. 209-224). Springer, Berlin, Heidelberg. Germany.

(Continued)

*Primary Examiner* — Ghazal B Shehni
(74) *Attorney, Agent, or Firm* — Maschoff Brennan

(57) ABSTRACT

A system may include a communication device configured to communicate over a network, one or more processors, and one or more non-transitory computer-readable media containing instructions that, when executed by the one or more processors, cause the system to perform one or more operations. The operations may include performing a cryptographic operation on one or more packets to facilitate secure communication between the system and a computing device over the network, the cryptographic operation including probabilistic rounding. The operations may also include communicating, via the communication device, with the computing device over the network using the one or more packets.

18 Claims, 7 Drawing Sheets

(56) References Cited

OTHER PUBLICATIONS

Pointcheval, D., & Johansson, T. (Eds.). (2012). Advances in Cryptology—EUROCRYPT 2012: 31st Annual International Conference on the Theory and Applications of Cryptographic Techniques, Cambridge, UK, Apr. 15-19, 2012, Proceedings (vol. 7237). Springer Science & Business Media.
Peikert, C. (Oct. 2014). Lattice cryptography for the internet. In International Workshop on Post-Quantum Cryptography (pp. 197-219). Springer, Cham.
Regev, O. (2009). On lattices, learning with errors, random linear codes, and cryptography. Journal of the ACM (JACM), 56(6), 34.
Cheon, J. H., Kim, D., Lee, J., & Song, Y. S. (2016). Lizard: Cut off the Tail!//Practical Post-Quantum Public-Key Encryption from LWE and LWR. IACR Cryptology ePrint Archive, 2016, 1126.
EESR in Application No. 18169118.9 dated Sep. 4, 2018.
Singh et al. "Even More Practical Key Exchanges for the Internet using Lattice Cryptography" International Association for Cryptologic Research, vol. 20151222: 163745, Nov. 19, 2015, pp. 1-19.

* cited by examiner

ENHANCED COMMUNICATION SECURITY

FIELD

The embodiments discussed in the present disclosure are related to enhanced communication security.

BACKGROUND

With the proliferation of computer networks, there has also arisen a variety of malicious actors seeking to access information communicated over computer networks. Efforts have been made to provide secure communications over computer networks.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a system that includes a communication device configured to communicate over a network, one or more processors, and one or more non-transitory computer-readable media containing instructions that, when executed by the one or more processors, cause the system to perform one or more operations. The operations may include performing a cryptographic operation on one or more packets to facilitate secure communication between the system and a computing device over the network, the cryptographic operation including probabilistic rounding. The operations may also include communicating, via the communication device, with the computing device over the network using the one or more packets.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
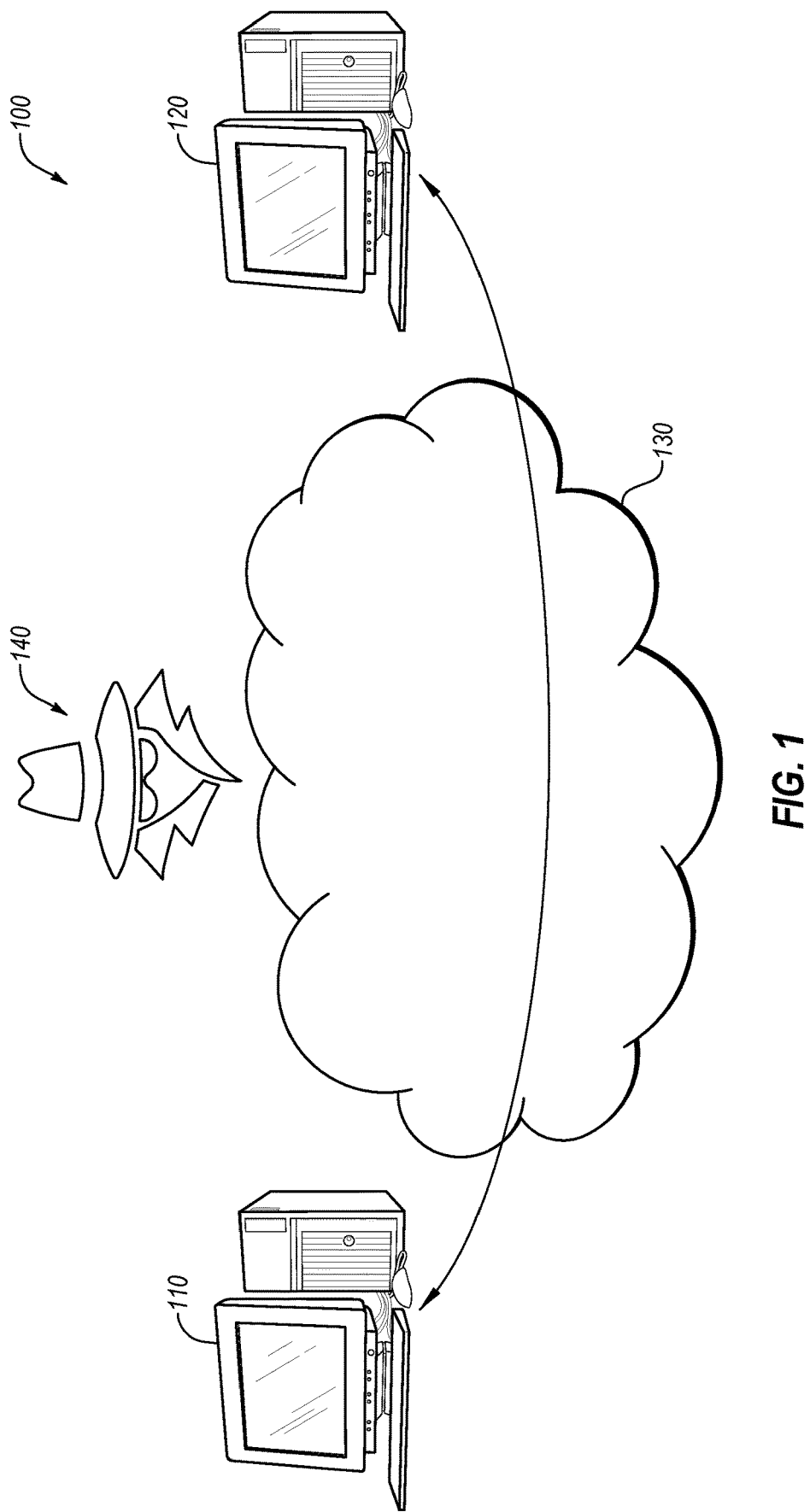
FIG. 1 illustrates an example environment related to enhanced communication security.

The present disclosure relates to enhanced communication security. Quantum computers are under development which may change the way current security measures are considered. For example, typical security measures that may be sufficient with current computers may be subject to attack using quantum computers. Not only does this pose a problem for security protocols when quantum computers become available, but also poses a problem of forward security. For example, an adversary may capture encrypted data that may not be decipherable now, but when quantum computers are available, the previously captured data may be decrypted using a quantum computer. Thus, there may be circumstances in which improved cryptographic techniques may be beneficial to improve secure communications such that those communications are secure even to attacks from a quantum computer.

In some embodiments of the present disclosure, communication security may be enhanced by the use of probabilistic rounding in cryptographic operations. Probabilistic rounding may refer to any mathematical operation in which a value is rounded in some circumstances, and not rounded in others. In some embodiments, probabilistic rounding may determine whether a value is within a threshold distance of the rounding boundary. If the value is within the threshold distance, the value may be discarded or additional randomness may be introduced to the value. In some embodiments, probabilistic rounding may be used in the encryption of data packets or in the generation of keys or key components. In some embodiments, probabilistic rounding may utilize modular rounding.

The use of probabilistic rounding may provide a number of benefits to the operation of a computer itself, to a network communicating the data, and to the related field of communication security. With respect to the computer itself, the probabilistic rounding may gain efficiencies over other cryptographic techniques. For example, the use of rounding may simplify and speed up the rate at which certain cryptographic operations may be performed. By speeding up the process, the computer itself that is performing the cryptographic operation may improve its performance. Thus, embodiments of the present disclosure may improve the performance of a computer itself.

With respect to improving the operation of a network, the probabilistic rounding may decrease the size of encrypted data, allowing for reduced network bandwidth requirements, thus preserving valuable network resources. By way of example, if a number is rounded from Ser. No. 10/678,994 to Ser. No. 10/679,000, the three trailing zeros need not be transmitted across the network and the number may be lifted at the receiving device. For example, when rounding from Ser. No. 10/678,994 to Ser. No. 10/679,000, the value 10,679 may be transported across the network, and the receiving device may lift the value 10,679 back to Ser. No. 10/679,000. Thus, embodiments of the present disclosure may improve the functioning of the network by preserving network resources. Additionally, while typical numerical values are used in this example, binary representation of numerical values may also be used.

With respect to improving the related field of communication security, the probabilistic rounding may increase the security of communications over typical cryptographic techniques. For example, by discarding values or adding randomness to values that are within a threshold distance of a rounding boundary, in some circumstances adversaries that observe those values may be unable to differentiate those values from a truly random value. Thus, embodiments of the present disclosure may improve the related field of communication security.

Embodiments of the present disclosure are explained with reference to the accompanying drawings.

FIG. 1 illustrates an example environment 100 related to enhanced communication security, in accordance with one or more embodiments of the present disclosure. In some embodiments, the environment 100 may include a first computing device 110 and a second computing device 120 in communication over a network 130. The first computing device 110 and the second computing device 120 may attempt to communicate in a secure manner, while an adversary 140 may attempt to compromise the security of the communication between the first computing device 110 and the second computing device 120.

In some embodiments, the first computing device 110 and/or the second computing device 120 may utilize one or more cryptographic techniques to facilitate secure communication between the first computing device 110 and the second computing device 120. For example, the first computing device 110 may exchange key components with the second computing device 120 such that both computing devices may generate a shared key. As an additional example, the first computing device 110 may generate a public key and a secret key, and may share the public key such that the second computing device 120 may access the public key and encrypt data using the public key and the first computing device 110 may decrypt the encrypted data using the secret key. In these and other embodiments, the first computing device 110 and/or the second computing device 120 may utilize probabilistic rounding in performing the one or more cryptographic techniques. Two examples of probabilistic rounding are described with reference to FIGS. 2A and 2B.

With reference to key exchange as an example of a cryptographic technique, in some embodiments, the first computing device 110 may generate a first public key component and first secret information. The first computing device 110 may send the first public key component to the second computing device 120 over the network 130. Using the first public key component, the second computing device may generate a second public key component and second secret information. The second computing device 120 may transmit the second public key component to the first computing device 110. The first computing device 110 may derive a shared key using one or more of the first and second public key components and the first secret information, and the second computing device 120 may derive the shared key using one or more of the first and second public key components and the second secret information. Using the shared key, the first computing device 110 and/or the second computing device 120 may encrypt or otherwise protect data to be transmitted back and forth between the first computing device 110 and the second computing device 120. Additionally or alternatively, the first computing device 110 and/or the second computing device 120 may submit requests for restricted content that includes or is based on the shared key. In some embodiments, the adversary 140 may observe or view the first public key component and the second public key component as they are exchanged. However, the adversary 140 may not be able to derive the shared key based on the first and second public key components alone.

With reference to public key encryption as another example of a cryptographic technique, the first computing device 110 may generate a public key and a secret key. The first computing device 110 may send the public key to the second computing device 120. The second computing device 120 may encrypt a message using the public key and send the encrypted message to the first computing device 110. The first computing device 110 may use the secret key to decrypt the message. The adversary 140 may observe the public key and may observe the encrypted message. However, the adversary 140 may not be able to decrypt the message with just the public key, and may be unable to distinguish the encrypted message from random values.

In some embodiments, the first computing device 110 and/or the second computing device 120 may utilize probabilistic rounding to improve the security of the communication between the first computing device 110 and the second computing device 120. For example, in some embodiments, probabilistic rounding may be utilized in the encryption of a packet. An example of utilizing probabilistic rounding to encrypt a packet is described with respect to FIG. 3 and/or FIG. 4. As another example, in some embodiments, probabilistic rounding may be utilized in the generation of the public key components. An example of utilizing probabilistic rounding with respect to generation of public key components is described with respect to FIGS. 5A and 5B.

Figure 6:
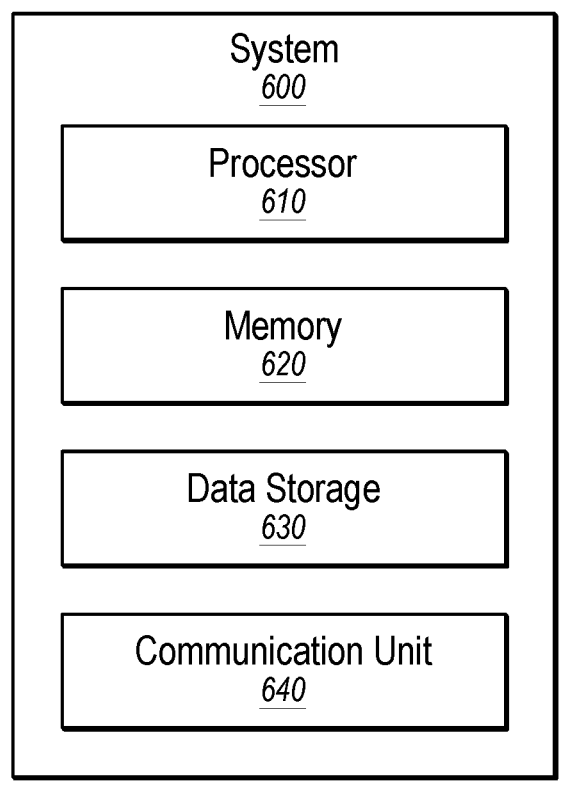
FIG. 6 illustrates an example computing system.

The first computing device 110 and the second computing device 120 may be implemented as any computing device configured to communicate over the network 130, such as a computing system as described with respect to FIG. 6.

The network 130 may be implemented as a conventional type network, a wired or wireless network, and/or may have any of numerous different configurations or combinations thereof. Furthermore, the network 130 may include a local area network (LAN), a wide area network (WAN) (e.g., the Internet), or other interconnected data paths across which multiple devices and/or entities may communicate. In some embodiments, the network 130 may include a peer-to-peer network. The network 130 may also be coupled to or may include portions of a telecommunications network for sending data in a variety of different communication protocols. In some embodiments, the network 130 may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, or other approaches. The network 130 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks.

Modifications, additions, or omissions may be made to the environment 100 without departing from the scope of the present disclosure. For example, the environment 100 may include any number of computing devices connected in any manner. In many cases, the environment 100 may include more computing devices than illustrated.

When describing modular rounding mathematically, for an integer p≤q, modular rounding may be described mathematically as $$\lceil \cdot \rfloor_p : \mathbb{Z}_q \to \mathbb{Z}_p \text{ that maps } x \to \lfloor (p/q) \cdot x \rceil$$

For example, if p is 10,000 and q is 100,000, a modular rounding function may multiply 10,000/100,000 (or $\frac{1}{10}$) by a value of interest and round the result to the nearest integer. Such rounding may remove unnecessary zeros from the rounded product. When applied to a matrix or vector, such rounding may be extended coordinate-wise over $\mathbb{Z}_q$.

In some embodiments, one mathematical approach used to secure communications may be referred to as a Learning With Errors (LWE) problem. The LWE problem may be described with reference to integers n and q, some distribution $\psi$ over $\mathbb{Z}_q$, and distributions $\mathcal{K}$ and $\mathcal{T}$, both distributions over $\mathbb{Z}_q^n$. The term $\mathbb{Z}_q^n$ may represent a vector of integers of modulo q (e.g., real numbers from zero to q minus one) and with n integers. An LWE problem including (q, n, $\psi$, $\mathcal{K}$, $\mathcal{T}$) may be described with reference to an unspecified challenge oracle $O_\$^{LWR}, ^{LWE}$, being either a noisy pseudorandom sampler $O_\$^{LWR}, ^{LWE}$ carrying some constant random secret key $s \in \mathbb{Z}_q^n$ sampled from the distribution $\mathcal{K}$, or a truly random sampler $O_\$^{LWR}, ^{LWE}$, whose behaviors are respectively as follows:

$O_\$^{LWR}, {}_s^{LWE}$: Outputs samples of the form $(a_i, a_i \cdot s + \delta_i) \in \mathbb{Z}_q^n \times \mathbb{Z}_q$, where $s \in \mathbb{Z}$ includes a persistent value invariant across invocations sampled from the distribution $\mathcal{K}$, $\delta_i \in \mathbb{Z}_q$ includes a fresh sample from the distribution $\psi$, and $a_i \in \mathbb{Z}_q^n$ includes values sampled at random from $\mathcal{T}$.

$O_\$^{LWR}, {}_\$^{LWE}$: Outputs samples of the form $(a_i, r_i) \in \mathbb{Z}_q^n \times \mathbb{Z}_q$, where $a_i \in \mathbb{Z}_q^n$ includes values sampled at random from $\mathcal{T}$, and $r_i$ includes uniformly random samples from $\mathbb{Z}_q$. The variable $ may indicate that the oracle is truly random.

The LWE problem including (q, n, $\psi$, $\mathcal{K}$, $\mathcal{T}$) allows repeated queries to the challenge oracle $O_\$^{LWR}, ^{LWE}$. An algorithm $\mathcal{A}$ may decide WE problem if:

$$\text{Adv}^{LWE}[\mathcal{A}] \stackrel{\text{def}}{=} |\Pr[\mathcal{A}\,O_s^{LWE}=1] - \Pr[\mathcal{A}\,O_\$^{LWE}=1]|$$

is non-negligible for an s selected appropriately at random from $\mathcal{K}$, where Adv may represent an indication of an advantage in determining the values of the vector s, and Pr may represent a function to determine the probability of the event occurring (for example, $\Pr[\mathcal{A}\,O_s^{LWE}=1]$ may represent the probability that the algorithm $\mathcal{A}$ guesses the correct value for $O_s^{LWE}$).

In some embodiments, another mathematical approach used to secure communications may be referred to as a Learning With Rounding (LWR) problem. The LWR problem may be described with reference to integers n, p, and q, with $p \leq q$, some distribution $\psi$ over $\mathbb{Z}_q$, and distributions $\mathcal{K}$ and $\mathcal{T}$, both over $\mathbb{Z}_q^n$. An LWR problem including (q, p, n, $\psi$, $\mathcal{K}$, $\mathcal{T}$) may be described with reference to an unspecified challenge oracle $O_\$^{LWR}, ^{LWR}$, being either a noisy pseudorandom sampler $\mathcal{K}_s^{LWR}$ carrying some constant random secret key $s \in \mathbb{Z}_q^n$ sampled from the distribution $\mathcal{K}$, or a truly random sample $O_\$^{LWR}, {}_\$^{LWR}$, whose behaviors are respectively as follows:

$O_\$^{LWR}, {}_s^{LWR}$: Outputs samples of the form $(a_i, \lceil a_i \cdot s \rfloor_p) \in \mathbb{Z}_q^n \times \mathbb{Z}_p$, where $s \in \mathbb{Z}_q$ may include a persistent value invariant across invocations sampled from the distribution $\mathcal{K}$, and $a_i \in \mathbb{Z}_q^n$ includes values sampled at random from $\mathcal{T}$.

$O_\$^{LWR}, {}_\$^{LWR}$: Outputs samples of the form $(a_i, r_i) \in \mathbb{Z}_q^n \times \mathbb{Z}_p$, where $a_i \in \mathbb{Z}_q^n$ includes values sampled at random from $\mathcal{T}$, and $r_i$ includes uniformly random samples from $\mathbb{Z}_q$. The variable $ may indicate that the oracle is truly random.

The LWR problem including (q, p, n, $\psi$, $\mathcal{K}$, $\mathcal{T}$) allows repeated queries to the challenge oracle $O^{LWR}$. An algorithm $\mathcal{A}$ may decide the LWR problem if:

$$\text{Adv}^{LWR}[\mathcal{A}]\,\mathcal{A}\,|\Pr[\stackrel{\text{def}}{=}O_s^{LWR}=1] - \Pr[\mathcal{A}\,O_\$^{LWR}=1]|$$

is non-negligible for an s selected appropriately at random from $\mathcal{K}$.

In some embodiments, after modular rounding, an integer may be lifted back to the original order of magnitude. Lifting may be described mathematically with respect to p and q, with the same meaning as with the modular rounding. The lifting may be described mathematically as $$\{\cdot\}_{p \to q}^L : Z_p \to R_q \text{ that maps } x \to \frac{q}{p}x.$$

where R may represent real numbers where Z may represent integers. In this way, lifting may reverse the modular rounding function that reduced the orders of magnitude in order to lift the rounded value back to the original order of magnitude. In some embodiments, the lifting may be extended to be expressed as $$\{\bullet\}_{p \to q}^{L'} : Z_p \to Z_q.$$

In some embodiments, a boundary B may be included to determine how close a number may be to a rounding boundary before rounding. For example, for a family of distributions $\psi \in \{\psi_n\}_{n \in \mathbb{N}}$, the distributions may be considered bounded by B if the probability of the distribution falling within $-B$ and B is 1, or stated mathematically, if $$\Pr[\psi \in [-B,B]]=1.$$

In some embodiments, a mathematical approach used to secure communications may include probabilistic rounding that includes probabilistic rounding with boundary elimination. In such an embodiment, modular rounding may be performed on a numerical value unless the value is within a threshold amount of a rounding boundary B. Probabilistic rounding with boundary elimination may be referred to mathematically as $$\lceil \bullet \rfloor_p^{B,\psi} : Z_q \to Z_p$$

where p and q may be integers with $p \leq q$, B may refer to the rounding boundary and may be represented by $$B \in \mathbb{Z} < \frac{q}{p}/2,$$

and $\psi$ may include a distribution over $\mathbb{Z}_q$ that is a B-bounded error distribution. Applying probabilistic rounding with boundary elimination to an input $x \in Z_q$ may proceed as follows:

Sample $\delta \leftarrow \psi$ if $-B \leq \left(\left(x + \frac{q}{p}/2 + \delta\right) \bmod \frac{q}{p}\right) \leq B$ then return $\perp$ else return $\left\lceil \frac{x}{\frac{q}{p}} \right\rfloor_p$ where $\delta$ is a value sampled from the distribution $\psi$, and $\perp$ indicates that the value x is discarded. Thus, in circumstances when the modular value to be rounded is within the threshold value of the boundary B, the value may be discarded, and otherwise, the value may be modularly rounded. Probabilistic rounding with boundary elimination may be as secure as the LWE problem and/or the LWR problem, and may be more efficient than the LWE problem and/or the LWR problem.

In some embodiments, a mathematical approach used to secure communications may include probabilistic rounding that includes fake rounding with boundary elimination. In such an embodiment, modular rounding may be performed on a numerical value unless the value is within a threshold amount of a rounding boundary B, in which case additional randomness may be added to the value. Fake rounding with boundary elimination may be referred to mathematically as $$\lceil \cdot \rfloor_p^{\psi_B} : \mathbb{Z}_q \to \mathbb{Z}_p$$

where p and q may be integers with p≤q, B may refer to the rounding boundary and may be represented by $$B \in \mathbb{Z} < \frac{q}{p} / 4,$$

and ψ may include a distribution over $\mathbb{Z}_q$ that is a B-bounded error distribution. In some embodiments, fake rounding with boundary elimination may utilize an error cumulative distribution function (CDF) distribution, $\Psi_{B,x} \to \{0,1\}$. The error CDF may be distributed as follows, for a given x and ψ:

```
Sample δ ← ψ
if δ ≥ x then
    return 1
else
    return 0
```

Applying fake rounding with boundary elimination to an input $x \in \mathbb{Z}_q$ may proceed as follows:

$$\text{Set } y = \left\lfloor \frac{x}{\frac{q}{p}} \right\rfloor_p$$

```
Sample z ← Ψ_{B,x}
if z = 1 then
    Sample b ←$ {0, 1}
    if z mod q/p ≤ q/p /2 then
        Return y + b
    else
        Return y − b
else
    Return y
``` where z is a value sampled from the distribution error CDF distribution $\Psi_{B,x}$ that may indicate how close the value x is to the boundary (for example, if z is a 1 it may indicate that the value x is close to the boundary B, and so additional randomness is added), b is a value selected to add additional randomness to the rounded value. Thus, in circumstances when the value to be rounded is within the threshold value of the boundary B, the value may have additional randomness added, and otherwise, the value may be modularly rounded. Additionally, the fake rounding with boundary elimination may be similar to the probabilistic rounding with boundary elimination, with the variation that when the value to be rounded is close to the boundary, rather than being discarded, additional randomness is added to the value.

Figure 2A:
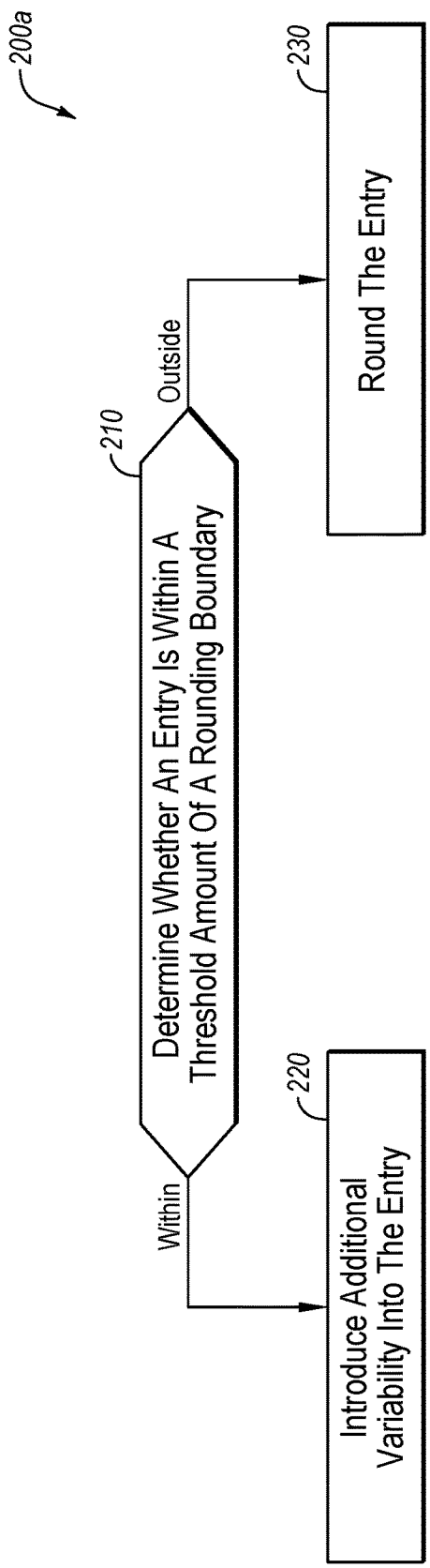
FIG. 2A illustrates a flowchart of an example method of probabilistic rounding.
Figure 2B:
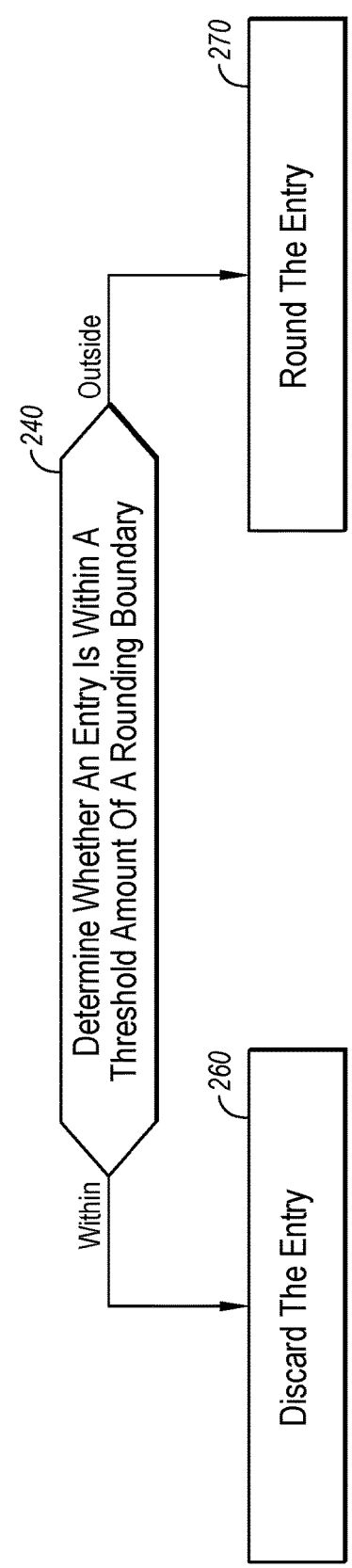
FIG. 2B illustrates a flowchart of another example method of probabilistic rounding.

FIGS. 2A and 2B illustrate flowcharts of example methods 200a and 200b of probabilistic rounding, in accordance with one or more embodiments of the present disclosure. The method 200a illustrates an example of fake rounding with boundary elimination, and the method 200b illustrates an example of probabilistic rounding with boundary elimination. The methods 200a and 200b may be performed by any suitable system, apparatus, or device. For example, the first or the second computing devices 110/120 of FIG. 1, or other system or device may perform one or more of the operations associated with either of the methods 200a and/or 200b. Although illustrated with discrete blocks, the steps and operations associated with one or more of the blocks of the methods 200a and 200b may be divided into additional blocks, combined into fewer blocks, or eliminated, depending on the desired implementation.

With reference to FIG. 2A, at block 210, a determination may be made as to whether an entry is within a threshold amount of a rounding boundary. For example, a computing device (such as the first computing device 110 of FIG. 1) may be performing a modular rounding function in conjunction with a cryptographic operation and may determine how close the entry is to a boundary B. In these and other embodiments, the entry may include a stand-alone value, or may include an element within a vector or matrix. In response to determining that the entry is within the threshold amount, the method 200a may proceed to the block 220. In response to determining that the entry is outside of the threshold amount, the method 200a may proceed to the block 230. An example of the mathematical operations of the block 210 may include:

```
Sample z ← Ψ_{B,x}
if z = 1 then . . .
else . . .
```

At block 220, additional variability may be introduced to the entry. For example, a computing device may increase variability for the entry such that the entry is more difficult to distinguish from a truly random value. For example, for some values, a result of a modular rounding operation may have an additional one or a zero added to it, and for other values, a result of the modular rounding operation may have an additional one or a zero subtracted from it. An example of the mathematical operations of the block 220 may include:

```
Sample b ←$ {0, 1}
if z mod q/p ≤ q/p /2 then
    Return y + b
else
    Return y − b
```

At block 230, the entry may be rounded. For example, a computing device may perform a modular rounding operation on the entry. An example of the mathematical operations of the block 230 may include:

$$\text{Set } y = \left\lfloor \frac{x}{\frac{q}{p}} \right\rfloor_p$$
$$\text{if } z = 1 \text{ then } \ldots$$
$$\text{else}$$
$$\text{Return } y$$

With reference to FIG. 2B, at block 240, a determination may be made as to whether an entry is within a threshold amount of a rounding boundary. The block 240 may be similar or comparable to the block 210 of FIG. 2A. In response to determining that the entry is within the threshold amount, the method 200b may proceed to the block 260. In response to determining that the entry is outside of the threshold amount, the method 200b may proceed to the block 270. An example of the mathematical operations of the block 240 may include:

$$\text{Sample } \delta \leftarrow \psi$$
$$\text{if } -B \leq \left(\left(x + \frac{\frac{q}{p}}{2} + \delta\right) \bmod \frac{q}{p}\right) \leq B \text{ then}$$
$$\text{else } \ldots$$

At block 260, the entry may be discarded. For example, if the entry of the block 240 is within the threshold of the boundary, a computing device (such as the first computing device 110) may discard the entry from being included during a cryptographic operation. An example of the mathematical operations of the block 260 may include:

$$\text{if } -B \leq \left(\left(x + \frac{\frac{q}{p}}{2} + \delta\right) \bmod \frac{q}{p}\right) \leq B \text{ then}$$
$$\text{return } \perp$$

At block 270, the entry may be rounded. The block 270 may be similar or comparable to the block 230 of FIG. 2A. An example of the mathematical operations of the block 270 may include:

$$\text{if } -B \leq \left(\left(x + \frac{\frac{q}{p}}{2} + \delta\right) \bmod \frac{q}{p}\right) \leq B \text{ then}$$
$$\ldots$$
$$\text{else}$$
$$\text{return } \left\lfloor \frac{x}{\frac{q}{p}} \right\rfloor_p$$

Accordingly, the methods 200a and 200b may be used to perform probabilistic rounding. Modifications, additions, or omissions may be made to the methods 200a and/or 200b without departing from the scope of the present disclosure. For example, the operations of the methods 200a and/or 200b may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 3:
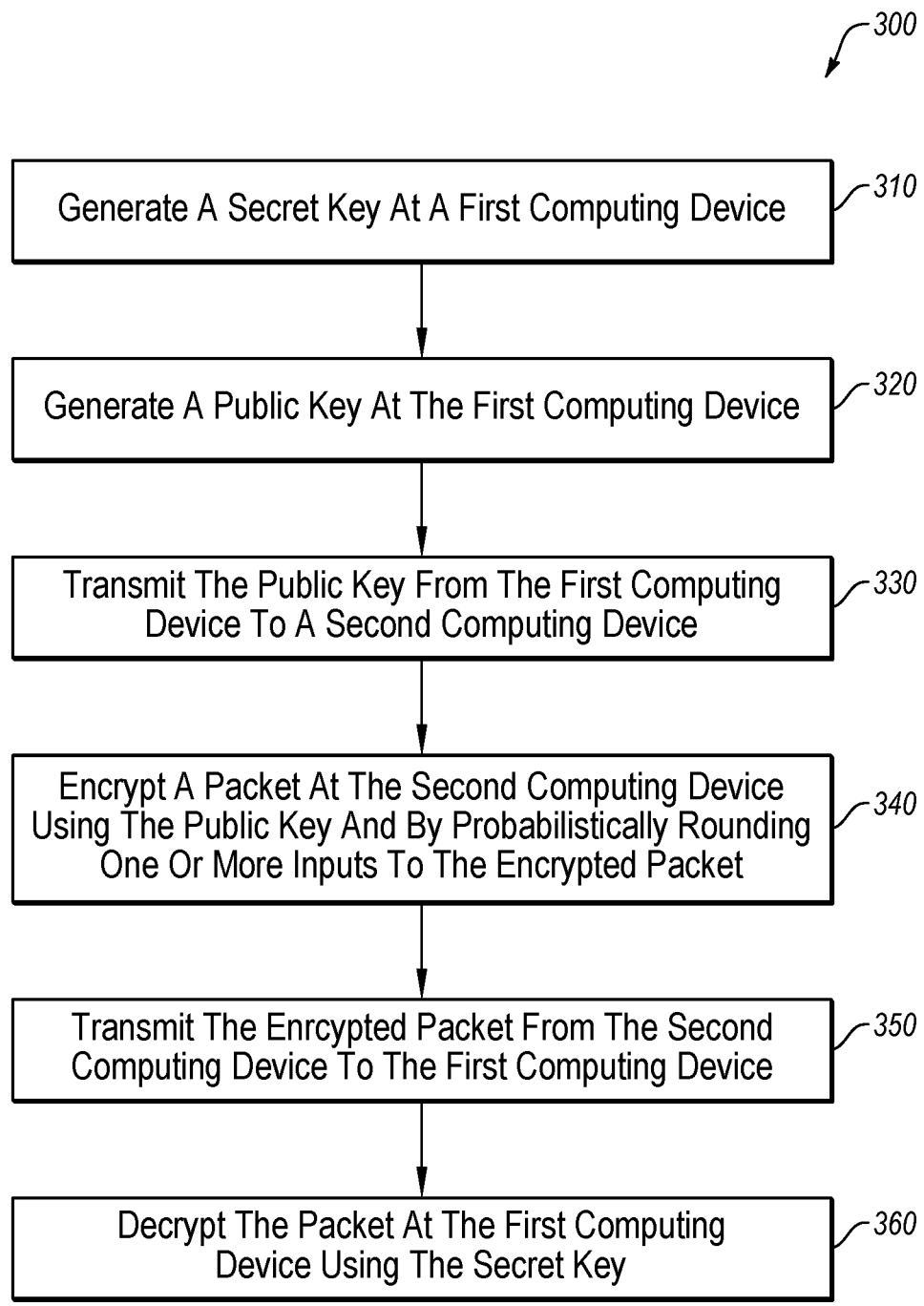
FIG. 3 illustrates a flowchart of an example method of utilizing probabilistic rounding to enhance communication security.

FIG. 3 illustrates a flowchart of an example method 300 of utilizing probabilistic rounding to enhance communication security, in accordance with one or more embodiments of the present disclosure. The method 300 may be performed by any suitable system, apparatus, or device. For example, the first or the second computing devices 110/120 of FIG. 1, or other systems or devices may perform one or more of the operations associated with the method 300. Although illustrated with discrete blocks, the steps and operations associated with one or more of the blocks of the method 300 may be divided into additional blocks, combined into fewer blocks, or eliminated, depending on the desired implementation. In some embodiments, the method 300 implements an example of public key exchange utilizing probabilistic rounding.

At block 310, a secret key may be generated. For example, a first computing device (such as the first computing device 110 of FIG. 1) may generate a secret key as part of a cryptographic operation. The secret key may include a mathematical value or operator that may be utilized by the first computing device to decrypt data packets received from other computing devices. An example of the mathematical operations of the block 310 may include a KeyGen operation using the integers m, n, $h_s$, $h_r$, l, t, p, and q with $h_s < n$, $h_r < m$, and t|p|q where | represents the divides operator (e.g., there is no remainder when t is divided by p or q, and no remainder when p is divided by q).

The KeyGen operation may output a public key pk and a secret key sk. For example:

$$pk \leftarrow (A \| B) \in \mathbb{Z}$$

$$sk \leftarrow S \in \{0, \pm 1\}^{n \times \ell}$$

where $$A \xleftarrow{\$} \mathbb{Z}_q^{m \times n}.$$

For example, A may be a matrix of dimension m by n with random values from the space $\mathbb{Z}_q$, and where $S = (s_1 \| \ldots \| s_\ell)$, and $s_i \leftarrow \text{HWT}_n(h_s)$. For example, S may be a matrix of secret vectors, derived based on a hamming weight distribution, $\text{HWT}_n$. For example, $\text{HWT}_n(w)$ may include a set of 1 vectors in dimension n with hamming weight w, and where $E \in \mathbb{Z}_q^{m \times \ell}$, and $E_{ij} \leftarrow \psi$. For example, E may be a matrix to introduce randomness to protect the secrecy of S, and may be of dimension m by $\ell$ with elements selected from a B-bounded error distribution $\psi: \{\bullet\} \rightarrow \mathbb{Z}_q$, and where $B \leftarrow AS + E$. For example, B may be a matrix that combines A, S, and E. Thus, the public key may include a concatenation of A and B, and the secret key may be S.

At block 320, a public key may be generated at a first computing device. For example, a first computing device (such as the first computing device 110 of FIG. 1) may generate a public key as part of a cryptographic operation. The public key may include a mathematical value or operator that may be utilized by one or more other computing devices to encrypt one or more data packets for communication to the first computing device. An example of the mathematical operations of the block 320 may include those described with respect to the block 310 to generate pk.

At block 330, the public key may be transmitted from the first computing device to a second computing device. For example, the first computing device may generate one or more data packets that include the public key and transmit the data packets over a network to the second computing device (such as the second computing device 120 of FIG. 1).

At block 340, one or more data packets may be encrypted at the second computing device using the public key. The data packet encryption may utilize probabilistic rounding on at least one of the inputs used in generating the one or more encrypted data packets. For example, the second computing device may utilize probabilistic rounding to encrypt a data packet intended for the first computing device. An example of the mathematical operations associated with the block 340 may include encrypting a message m using the public key pk into the encrypted message c using an $\text{Enc}_{pk}(m \in \mathbb{Z}_t^\ell)$ operation, as illustrated below:

$$r \leftarrow HWT_m(h_r)$$
$$a' \leftarrow A^T r$$
$$b' \leftarrow B^T r$$
$$a \leftarrow \mathbf{a'}|_p^{\hat{c},p} \in \mathbb{Z}_p^n$$
$$b \leftarrow \mathbf{b'}|_p^{\hat{c},\psi} + \frac{p}{t}m \in \mathbb{Z}_p^\ell$$
$$c \leftarrow (a, b) \in \mathbb{Z}_p^{n+\ell}$$

where r is a vector of values to introduce randomness, with elements based on the hamming weight distribution, a' and b' are vectors of the combinations of the transpositions of A and B, respectively, and r. The encrypted message c may include two components, a and b. a may include the probabilistic rounding (illustrated above with fake rounding with probabilistic boundary elimination) of a' in the space $\mathbb{Z}_p$, and b may include the probabilistic rounding (illustrated above with fake rounding with probabilistic boundary elimination) of b' and the secret message multiplied by $$\frac{p}{t}$$

to shift the message m to higher order bits. While illustrated as using fake rounding with probabilistic boundary elimination above, probabilistic rounding with boundary elimination may also be used. Another example of encrypting one or more data packets utilizing probabilistic rounding is described with reference to FIG. 4.

At block 350, the one or more packets encrypted at block 340 may be transmitted from the second computing device to the first computing device.

At block 360, the first computing device may decrypt the one or more packets using the secret key. For example, the first computing device may perform a $\text{Dec}_{sk}$ operation using the secret key on the encrypted message to derive the message m'. An example of the $\text{Dec}_{sk}$ operation may include:

$$m' \leftarrow \lceil S^T a + b \rfloor_t$$

where t represents the modulus of the original message of $\mathbb{Z}_t^\ell$. The $\text{Dec}_{sk}$ operation may remove the a' and b' from the encrypted message c to derive the original message.

Accordingly, the method 300 may be used to enhance secured communications using probabilistic rounding. Modifications, additions, or omissions may be made to the method 300 without departing from the scope of the present disclosure. For example, the operations of the method 300 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 4:
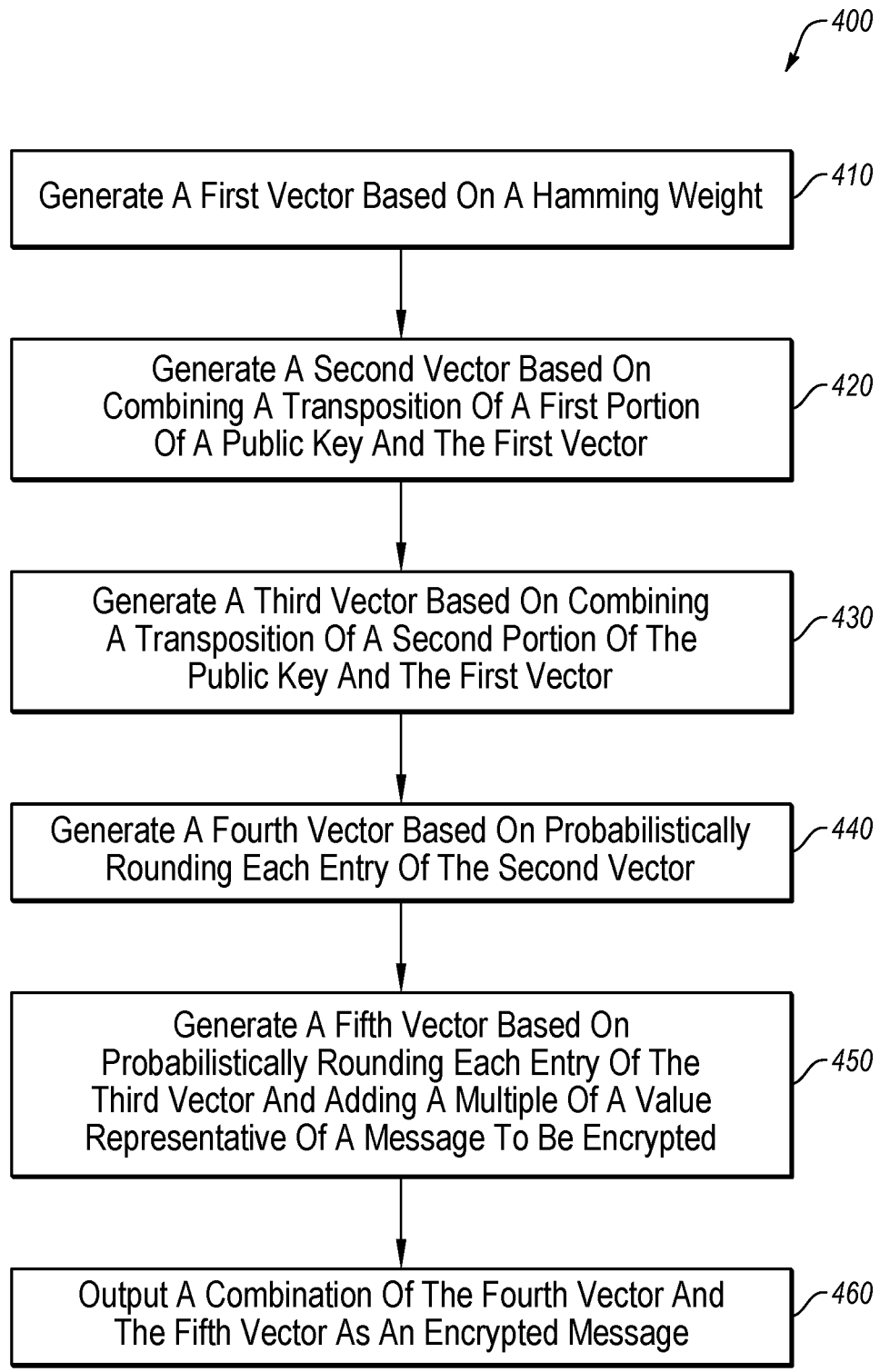
FIG. 4 illustrates a flowchart of an example method of encrypting a packet utilizing probabilistic rounding.

FIG. 4 illustrates a flowchart of an example method 400 of encrypting a packet utilizing probabilistic rounding, in accordance with one or more embodiments of the present disclosure. The method 400 may be performed by any suitable system, apparatus, or device. For example, the first or the second computing devices 110/120 of FIG. 1, or other systems or devices may perform one or more of the operations associated with method 400. Although illustrated with discrete blocks, the steps and operations associated with one or more of the blocks of the method 400 may be divided into additional blocks, combined into fewer blocks, or eliminated, depending on the desired implementation. The description of the method 400 may utilize one or more similar variables with similar meanings as used with reference to the block 340 of FIG. 3.

At block 410, a first vector or matrix may be generated based on a hamming weight. For example, a first computing device (such as the first computing device 110 of FIG. 1) may generate the vector r. In some embodiments, the vector r may be generated according to $r \leftarrow HWT_m(h_r)$.

At block 420, a second vector may be generated based on combining a transposition of a first portion of a public key and the first vector. For example, the first computing device may generate the vector a'. In some embodiments the vector a' may be generated according to $\mathbf{a'} \leftarrow A^T r$.

At block 430, a third vector may be generated based on combining a transposition of a second portion of the public key and the first vector. For example, the first computing device may generate the vector b'. In some embodiments the vector b' may be generated according to $\mathbf{b'} \leftarrow B^T r$.

At block 440, a fourth vector may be generated based on probabilistically rounding each entry of the second vector. For example, the first computing device may generate the vector a. In some embodiments the vector a may be generated according to $a \leftarrow \lceil \mathbf{a'}|_p^{\hat{c},p} \in \mathbb{Z}_p^n$. While illustrated as using one embodiment of probabilistic rounding (fake rounding with boundary elimination), other embodiments, such as fake rounding with boundary elimination, may also be utilized.

At block 450, a fifth vector may be generated based on probabilistically rounding each entry of the third vector and adding a multiple of a value representative of a message to be encrypted. In some embodiments, the value may include a vector of multiple values. For example, the first computing device may generate the vector b. In some embodiments the vector b may be generated according to $$b \leftarrow \mathbf{b'}|_p^{\hat{c},\psi} + \frac{p}{t}m \in \mathbb{Z}_p^\ell.$$

While illustrated as using one embodiment of probabilistic rounding (fake rounding with boundary elimination), other embodiments, such as fake rounding with boundary elimination, may also be utilized.

At block 460, an encrypted message may be output as a combination of the fourth and fifth vectors. For example, the first computing device may output the encrypted message c. In some embodiments the encrypted message c may be generated according to $$c \leftarrow (a, b) \in \mathbb{Z}_p^{n+\ell}.$$

Accordingly, the method 400 may be used to encrypt a packet using probabilistic rounding. Modifications, additions, or omissions may be made to the method 400 without departing from the scope of the present disclosure. For example, the operations of the method 400 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 5A:
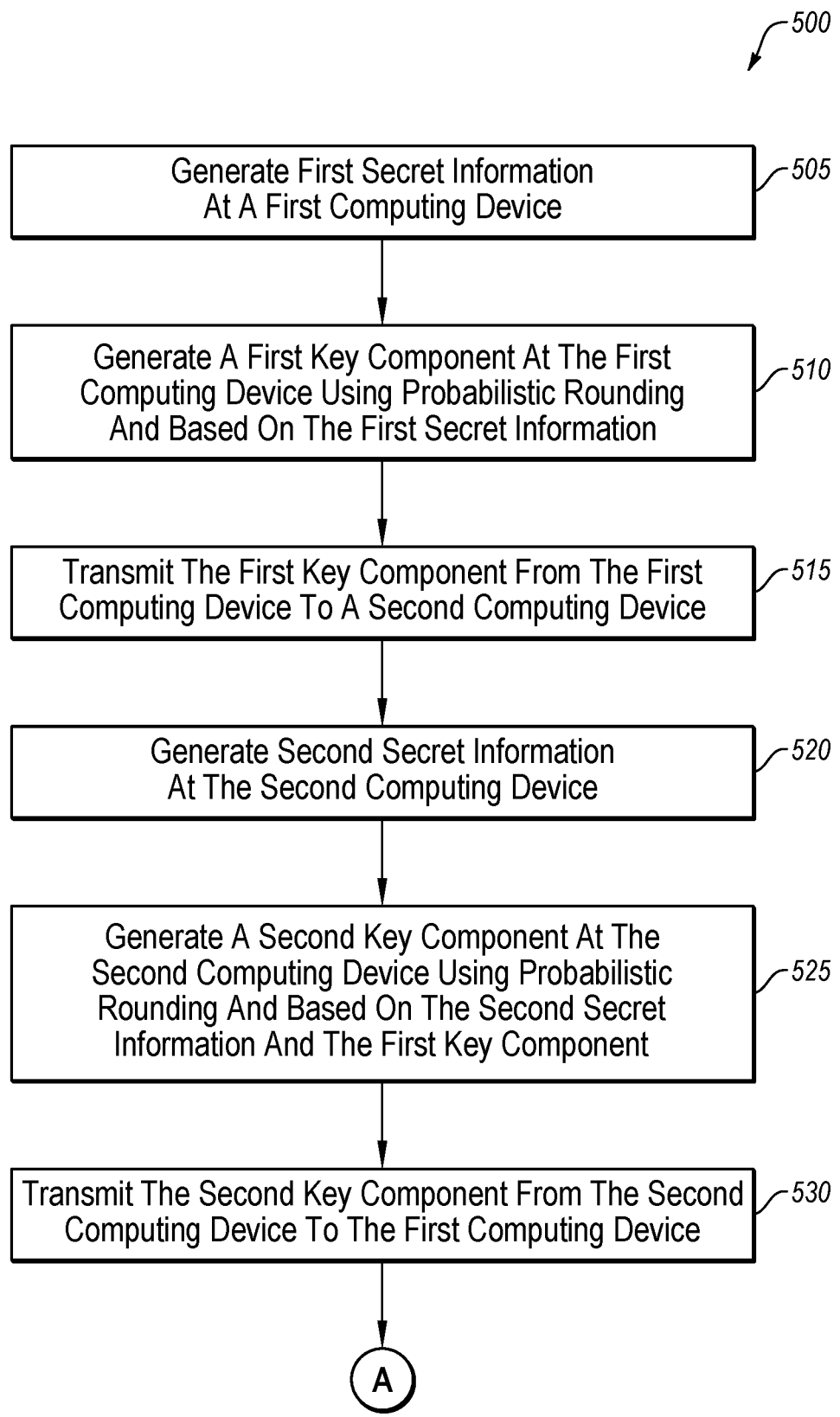
FIGS. 5A and 5B illustrate a flowchart of another example method of utilizing probabilistic rounding to enhance communication security.
Figure 5B:
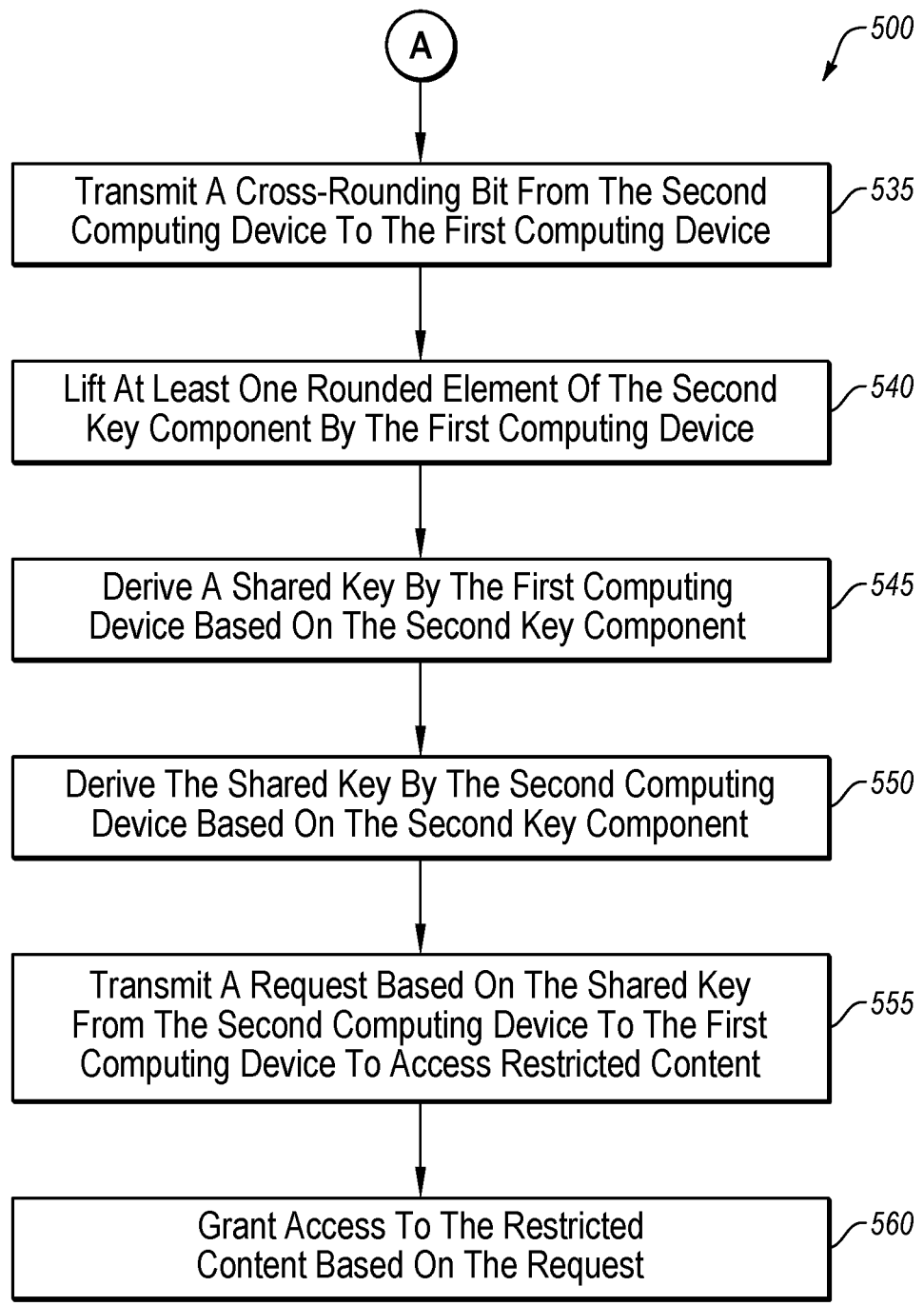

FIGS. 5A and 5B illustrate a flowchart of an example method 500 of utilizing probabilistic rounding to enhance communication security, in accordance with one or more embodiments of the present disclosure. The method 500 may be performed by any suitable system, apparatus, or device. For example, the first or the second computing devices 110/120 of FIG. 1, or other systems or devices may perform one or more of the operations associated with method 500. Although illustrated with discrete blocks, the steps and operations associated with one or more of the blocks of the method 500 may be divided into additional blocks, combined into fewer blocks, or eliminated, depending on the desired implementation. In some embodiments, the method 500 may illustrate an example of key exchange utilizing probabilistic rounding.

With reference to FIG. 5A, at block 505, first secret information may be generated at a first computing device. For example, a first computing device (such as the first computing device 110 of FIG. 1) may generate the first secret information as part of a cryptographic operation. An example of the mathematical operations of the block 505 may include:

$$S \leftarrow \psi(\mathbb{Z}_q^{n \times \bar{n}})$$

where $\psi$ may include a distribution over $\mathbb{Z}_q$ that is a B-bounded error distribution, and q, and B are the same as above, and n and $\bar{n}$ may represent dimensions of the matrix S.

At block 510, a first public key component based on the first secret information may be generated at a first computing device. In some embodiments, the first public key component may include two components, $seed_A$ and B. In some embodiments, utilizing $seed_A$ rather than A as the first public key component may preserve network bandwidth as $seed_A$ may be smaller than A. An example of the mathematical operations of the block 510 to derive the first public key component $seed_A$ and B may include:

$$A \in \mathbb{Z}_q^{n \times n} \leftarrow Gen(seed_A)$$

$$seed \in \{0, 1\}^s \xleftarrow{\$} U(\mathbb{Z}_2)^s$$

-continued $$B \leftarrow \lfloor AS \rceil_p^{\not\in \psi}$$

where seed is a uniformly random string of zeroes and ones of the length of S, and where Gen( ) may represent a known function to yield a predictable result A when performed on a $seed_A$, n may represent dimensions of the matrix A, $\psi$ may include a distribution over $\mathbb{Z}_q$ that is a B-bounded error distribution, and p, q, and B are the same as above. In some embodiments, the first key component may be generated using probabilistic rounding. While illustrated as using one embodiment of probabilistic rounding (fake rounding with boundary elimination), other embodiments, such as fake rounding with boundary elimination, may also be utilized.

At block 515, the first public key component may be transmitted from the first computing device to a second computing device (such as the second computing device 120 of FIG. 1).

At block 520, second secret information may be generated at the second computing device. The block 520 may be similar or comparable to the block 505, but the operations may be performed by the second computing device. An example of the mathematical operations of the block 520 to derive the second secret information S' may include:

$$S' \leftarrow \psi(\mathbb{Z}_q^{\bar{m} \times n})$$

where $\bar{m}$ may represent a dimension of the matrix S', and the other variables may be the same as above.

At block 525, a second public key component may be generated at the second computing device using probabilistic rounding. In some embodiments, the second public key component may be based on the second secret information and/or the first public key component. The second public key component may include the matrices B' and C. An example of the mathematical operations of the block 530 to derive the second public key component may include:

$$A \in \mathbb{Z}_q^{n \times m} \leftarrow Gen(seed_A)$$

$$B' \leftarrow \lfloor S'A \rceil_p^{\not\in \psi}$$

$$V \leftarrow \lfloor S'\{B\}_{p \rightarrow q}^{L'} \rceil_{p'}$$

where n and m are integers of the dimensions of A, B' may include a matrix that is the probabilistically rounded combination of the second secret information S' and the matrix A, and V may include a matrix that is the modularly rounded combination of the second secret information S' and the lifted matrix B. In some embodiments, using the probabilistically rounded version of B' may provide network bandwidth savings as B' may not have to carry trailing zeros.

At block 530, the second public key component may be transmitted from the second computing device to the first computing device.

With reference to FIG. 5B, at block 535, a cross-rounding bit may be transmitted from the second computing device to the first computing device. For example, the second computing device may generate one or more bits indicative of how certain rounding operations may be performed such that the second computing device and the first computing device may validate that the rounding between the two computing devices is being performed consistently. An example of the mathematical operations of the block 535 to derive the cross-rounding bit may include a cross rounding function. Such a cross-rounding function for a power of 2 p (e.g., $p=2^k$ for an integer k) may be described mathematically as $$\langle\cdot\rangle_p : Z_q \to \{0, 1\} \text{ that maps } x \to \left\lfloor \frac{2x}{p} \right\rfloor \bmod 2$$

where p is less than or equal to q, mod is a modulo operation, and the output for the function is one or more bits. Continuing the mathematical description at the second computing device, the one or more cross-rounding bits C may be generated by $$C \leftarrow \langle V \rangle_{2^\beta}$$

where $2^\beta$ may represent p in the cross-rounding function. In some embodiments, the one or more cross-rounding bits may be included as part of the second public key component generated at the block 525 and transmitted at the block 530.

At block 540, at least one rounded element of the second public key component may be lifted by the first computing device. For example, the first computing device may lift the matrix B'. In some embodiments, the second computing device may perform one or more lifting operations.

At block 545, a shared key may be derived by the first computing device based on the second public key component. For example, the first computing device may perform a mathematical operation on the lifted version of the matrix B', the first secret information S, and the cross-rounding bit C. Such a mathematical operation may be similar or comparable to that described in *On the Hardness of Learning With Rounding Over Small Modulus* (Andrej Bogdanov et al., TCC 2016-A: 14$^{th}$ Theory of Cryptography Conference, Part I, Vol. 9562 of *Lecture Notes in Computer Science*, pp. 209-224, Tel Aviv, Israel, Jan. 10-13, 2016, Springer), the entire disclosure of which is incorporated by reference. An example of the mathematical operations of the block 545 to derive the shared key K may include:

$$K \leftarrow \text{rec}(\{B'\}_{p \to q} L'S, C)$$

At block 550, the shared key may be derived by the second computing device based on the second public key component. For example, the second computing device may perform a modular rounding operation on the matrix V to generate the shared key. In some embodiments, the rounding is performed based on information utilized in or communicated by the cross-rounding bits. An example of the mathematical operations of the block 550 to derive the shared key K may include:

$$K \leftarrow [V]_{2^\beta}$$

At block 555, a request may be transmitted from the second computing device to the first computing device to request access to restricted content. The request may be based on the shared key. For example, the request may include the shared key, or may be encoded or encrypted using the shared key.

At block 560, access may be granted to the restricted content based on the request. For example, the first computing device may compare one or more aspects of the request that are based on the shared key and compare them to the shared key. Based on a match or based on the second computing device having the shared key, the first computing device may grant the second computing device access to the restricted content.

Accordingly, the method 500 may be used to encrypt a packet using probabilistic rounding. Modifications, additions, or omissions may be made to the method 500 without departing from the scope of the present disclosure. For example, the operations of the method 400 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

FIG. 6 illustrates an example computing system 600, according to at least one embodiment described in the present disclosure. The system 600 may include any suitable system, apparatus, or device configured to communicate over a network. The computing system 600 may include a processor 610, a memory 620, a data storage 630, and a communication unit 640, which all may be communicatively coupled. The data storage 630 may include various types of data, such as protocols or procedures for enhancing communication security, such as by using probabilistic rounding.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of network or physical locations that are configured to perform individually or collectively any number of operations described in the present disclosure. In some embodiments, the processor 610 may interpret and/or execute program instructions and/or process data stored in the memory 620, the data storage 630, or the memory 620 and the data storage 630. In some embodiments, the processor 610 may fetch program instructions from the data storage 630 and load the program instructions into the memory 620.

After the program instructions are loaded into the memory 620, the processor 610 may execute the program instructions, such as instructions to perform the methods 200a, 200b, 300, 400, or 500 of FIGS. 2A, 2B, 3, 4, and 5A and 5B, respectively. For example, the processor 610 may obtain instructions regarding generating one or more keys or encrypting a data packet.

The memory 620 and the data storage 630 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 610. In some embodiments, the computing system 600 may or may not include either of the memory 620 and the data storage 630.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

The communication unit 640 may include any component, device, system, or combination thereof that is configured to transmit or receive information over a network. In some embodiments, the communication unit 640 may communicate with other devices at other locations, the same location, or even other components within the same system. For example, the communication unit 640 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 640 may permit data to be exchanged with a network and/or any other devices or systems described in the present disclosure. For example, the communication unit 640 may allow the system 600 to communicate with other systems, such as computing devices and/or other networks.

Modifications, additions, or omissions may be made to the system 600 without departing from the scope of the present disclosure. For example, the data storage 630 may be multiple different storage mediums located in multiple locations and accessed by the processor 610 through a network.

As indicated above, the embodiments described in the present disclosure may include the use of a special purpose or general purpose computer (e.g., the processor 610 of FIG. 6) including various computer hardware or software modules, as discussed in greater detail below. Further, as indicated above, embodiments described in the present disclosure may be implemented using computer-readable media (e.g., the memory 620 or data storage 630 of FIG. 6) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A system comprising:
    a communication device configured to communicate over a network;
    one or more processors; and
    one or more non-transitory computer-readable media containing instructions that, when executed by the one or more processors, cause the system to perform one or more operations, the operations comprising:
        performing a cryptographic operation on one or more packets to facilitate secure communication between the system and a computing device over the network, the cryptographic operation including probabilistic rounding, the probabilistic rounding including fake rounding with probabilistic boundary elimination; and
        transmitting, via the communication device, to the computing device over the network, the one or more packets.

2. The system of claim 1, wherein the cryptographic operation includes:
    generating a first public key component to transmit to the computing device, at least one input to the first public key component probabilistically rounded and based on first secret information;
    transmitting the first public key component from the system to the computing device;
    receiving a second public key component at the system from the computing device, at least one input to the second public key component probabilistically rounded; and
    deriving a shared key based on the second public key component and the first secret information.

3. The system of claim 1, wherein the cryptographic operation includes:
    receiving a public key from the computing device;
    encrypting the one or more packets using the public key by probabilistically rounding one or more inputs to the encrypted one or more packets of data; and
    transmitting the one or more encrypted packets to the computing device.

4. The system of claim 1, wherein the probabilistic rounding includes rounding with probabilistic boundary elimination.

5. The system of claim 1, wherein the fake rounding with probabilistic boundary elimination includes:
    determining whether an entry associated with the cryptographic operation is within a threshold amount of a rounding boundary; and
    in response to the entry being within the threshold amount of the rounding boundary introducing additional variability to the entry.

6. A method comprising:
    performing a cryptographic operation on one or more data packets to facilitate secure communication between a first computing device and a second computing device over a network, the cryptographic operation including probabilistic rounding, the probabilistic rounding including fake rounding with probabilistic boundary elimination; and
    transmitting, via a communication device of the first computing device, to the second computing device over the network, the one or more data packets.

7. The method of claim 6, wherein the cryptographic operation includes:
    generating a first public key component to transmit to the second computing device, at least one input to the first public key component probabilistically rounded and based on first secret information;
    transmitting the first public key component from the first computing device to the second computing device;
    receiving a second public key component at the first computing device from the second computing device, at least one input to the second public key component probabilistically rounded; and
    deriving a shared key based on the second public key component and the first secret information.

8. The method of claim 7, further comprising:
    receiving, by the first computing device, a request for the second computing device to access restricted content, the request including the shared key; and
    granting the second computing device access to the restricted content based on the request.

9. The method of claim 7, further comprising lifting at least one rounded element of the second public key component.

10. The method of claim 7, further comprising receiving at least one cross-rounding bit from the second computing device, wherein deriving the shared key is further based on the at least one cross-rounding bit.

11. The method of claim 6, wherein the cryptographic operation includes:
    receiving a public key from the second computing device;
    encrypting the one or more data packets using the public key by probabilistically rounding one or more inputs to the encrypted one or more data packets; and
    transmitting the one or more encrypted data packets to the second computing device.

12. The method of claim 11, wherein encrypting the one or more data packets comprises:
    performing a probabilistic rounding on each element of a first matrix associated with the public key to generate first data;
    performing the probabilistic rounding on each element of a second matrix associated with the public key;
    adding a message of the packet to the probabilistically rounded second matrix to generate second data; and
    outputting a combination of the first data and the second data as the encrypted packet.

13. The method of claim 6, wherein the probabilistic rounding includes rounding with probabilistic boundary elimination.

14. The method of claim 6, wherein the fake rounding with probabilistic boundary elimination includes:
    determining whether an entry associated with the cryptographic operation is within a threshold amount of a rounding boundary; and
    in response to the entry being within the threshold amount of the rounding boundary, introducing additional variability to the entry.

15. The method of claim 14, wherein the fake rounding with probabilistic boundary elimination further includes, in response to the entry being outside of the threshold amount of the rounding boundary, rounding the entry.

16. A non-transitory computer-readable media including instructions that, in response to being executed by one or more processors, perform operations, the operations comprising:

performing a cryptographic operation on one or more data packets to facilitate secure communication between a first computing device and a second computing device over a network, the cryptographic operation including probabilistic rounding, the probabilistic rounding including fake rounding with probabilistic boundary elimination; and transmitting, via a communication device of the first computing device, to the second computing device over the network, the one or more data packets.

17. The computer-readable media of claim 16, wherein the cryptographic operation includes:

generating a first public key component to transmit to the second computing device, at least one input to the first public key component probabilistically rounded and based on first secret information;

transmitting the first public key component from the first computing device to the second computing device;

receiving a second public key component at the first computing device from the second computing device, at least one input to the second public key component probabilistically rounded; and deriving a shared key based on the second public key component and the first secret information.

18. The computer-readable media of claim 16, wherein the cryptographic operation includes:

receiving a public key from the second computing device;

encrypting the one or more data packets using the public key by probabilistically rounding one or more inputs to the encrypted one or more data packets; and transmitting the one or more encrypted data packets to the second computing device.

\* \* \* \* \*